United States Patent [19]
Condit, Sr.

[11] Patent Number: 4,631,127
[45] Date of Patent: Dec. 23, 1986

[54] MULTI-PURPOSE FILTER SYSTEM

[76] Inventor: Paul A. Condit, Sr., 10737 N. Autumnwood Way, The Woodlands, Tex. 77380

[21] Appl. No.: 737,739

[22] Filed: May 28, 1985

Related U.S. Application Data

[63] Continuation of Ser. No. 549,803, Nov. 9, 1983, abandoned, which is a continuation of Ser. No. 220,976, Dec. 29, 1980, abandoned.

[51] Int. Cl.$^4$ ............................................. B01D 29/00
[52] U.S. Cl. ................................... 210/232; 210/452; 210/456; 210/457
[58] Field of Search ............... 210/232, 451, 452, 456, 210/457, 510

[56] References Cited
U.S. PATENT DOCUMENTS

| | | | |
|---|---|---|---|
| 1,652,173 | 12/1927 | Lalor | 210/452 |
| 2,352,269 | 7/1944 | Kraissl, Jr. | 210/452 |
| 2,728,458 | 12/1955 | Schultz | 210/457 |
| 3,216,571 | 11/1965 | Whiting et al. | 210/456 |
| 4,072,616 | 2/1978 | Rohlig | 210/510 |
| 4,170,556 | 10/1979 | Pall | 210/457 |

Primary Examiner—John Adee
Attorney, Agent, or Firm—Bernard A. Reiter

[57] ABSTRACT

A filter system for fluids having an elongate filter basket mounted in tension in a filter housing, the filter element being retained therein by a boltless flange engaging the top thereof and an elongate tube engaging the element bottom and urging it downwardly in response to a single nut engaging a rod through the tube and element and fixed to the housing. A novel filter element for the system is disclosed having longitudinal support rods for containing and supporting a fragile filter medium, such as sintered metal, in any size filter element. In another embodiment, a novel filter element for indepth filtering is disclosed.

32 Claims, 5 Drawing Figures

MULTI-PURPOSE FILTER SYSTEM

This is a continuation of application Ser. No. 549,803 filed Nov. 9, 1983 now abandoned, which is a continuation of application Ser. No. 220,976, filed Dec. 29, 1980.

BACKGROUND OF THE INVENTION

This invention relates to filtering systems for filtering or straining fluids and in particular to a filter system having changeable filter elements with filter media for any degree of filtering and providing for uniform distributed flow through all parts of the filter element.

Fluid filtering systems with changeable filter elements for different degrees of filtering are known in the art. Filtering systems are known which include a generally tubular filter basket having a body comprising the desired filtering medium, a closed bottom and an open top. The basket is mounted in a filter housing in the fluid stream such that flow is through the sides of the basket to the outlet. The prior art basket includes a flange at the top of the basket. The basket is secured to a flange ring fixed in the housing by bolts through the basket flange threadably engaging with the housing ring flange. Several problems are apparent in the prior art. Filter elements of the elongate basket type are inconvenient and difficult to remove from the filter housing. The means for retaining such baskets in the filter housing restricts the size of the filter basket. The range of filter element materials and filtering actions is limited to coarser less fragile filtering media. And, plugging of the filter element or basket causes the concentration of flow through the basket at a certain area.

Removal of the filter basket is difficult as a number of bolts must be removed and replaced to change it. Corrosion of the bolts or housing flange threads make removal of the bolts even more difficult.

Bolting the basket to a flange also restricts the size of the basket useable in the housing. The housing flange must necessarily have sufficient width to be bored and threaded to accept the bolts, sufficient clearance must be allowed between the housing and the bolt heads to facilitate their removal, and the diameter of filter basket that will fit in the housing flange is limited by these conditions.

Limitations on the filtering media comprising the filter basket is another problem in the prior art. Vibrations caused by flow of fluid through the basket cause flutter and fatigue in the filter media, causing it to break or fail. The use of fine or fragile filtering media in filter baskets has therefore been limited. When the flow is pulsating or intermittent, stress on the filter basket is increased and the problem aggravated. Heretofore, use of fragile sintered metal filter media has been confined to relatively small filters.

Pegging of the filter element or basket is also a problem in the prior art filter system. Pegging occurs when the inlet flow is directed against a particular part of the basket and flow is not uniformly distributed about the basket. In such case, one part of the basket receives a greater part of the total flow through the basket than the other parts of the basket. As a result, that part of the basket becomes clogged or dirty before the other parts of the basket. Optimally, the pressure at and flow through each part of the filter medium of the basket should be uniform.

SUMMARY OF THE INVENTION

The problems inherent in the prior art filter system are overcome by providing a filter system having a housing with an inlet, an outlet, with a curved flow baffle mounted in the housing dividing the housing into a first chamber communicating with the inlet and a second chamber communicating with the outlet. The upper section of the flow baffle is sealingly mounted with the housing so that the lower section of the flow baffle defines the boundary between the first and second chambers. A ring flange is mounted with the inner periphery of the housing and the flow baffle therein for receiving the filter element.

The filter element is preferably a generally tubular filter basket with sides comprising filter medium, a closed end, and an open end having a mounting flange. The basket is mounted in the second chamber of the housing by positioning the basket through the ring flange and applying a downward force to the basket bottom to pull the basket flange into sealing engagement with the housing ring flange and maintain the sides of the basket in a state of tension. Tensioning the basket sides minimizes the destructive effects of vibration on the filter and permits use of a properly supported fragile filter medium.

In one embodiment the means for tensioning the basket includes temperature compensating means for maintaining tension on the basket as fluid temperature in the filter varies. Tension is provided by a single nut engaging a threaded rod through the basket bottom. Since there is no need for flange bolts to retain the basket the housing contains a larger basket.

A novel filter element comprising a fragile filter medium, such as sintered metal or screen is provided having means for supporting the medium to prevent its tear or collapse. In one embodiment, longitudinally extended support rods comprise the basket sides and support the filter screen.

In the preferred embodiment, the inlet flow is directed to a flow baffle and is distributed around the baffle throughout the volume of the first chamber, decreasing the velocity of low. The flow baffle partially wraps around the filter basket in an optimum configuration, causing the flow through the basket to be uniformly distributed through all parts of the basket.

A filter basket is mounted in the second chamber preferably with a single nut, enabling the basket to be quickly and conveniently removed or changed. The basket is further maintained in the housing in a state of tension to prevent flutter or collapse of the basket. The tensioning means includes temperature compensation and enables filtering of fluids over a range of temperatures without leakage of unfiltered fluid through the basket flange and housing flange juncture caused by disparate expansion of the filter components.

A new and improved filter basket using fragile filter media is disclosed which can be fabricated in any size and an indepth filter basket is provided for the filtering system in which successively finer particulate is filtered from the fluid in the filter basket.

DESCRIPTION OF THE PREFERRED EMBODIMENT

Figure 1:
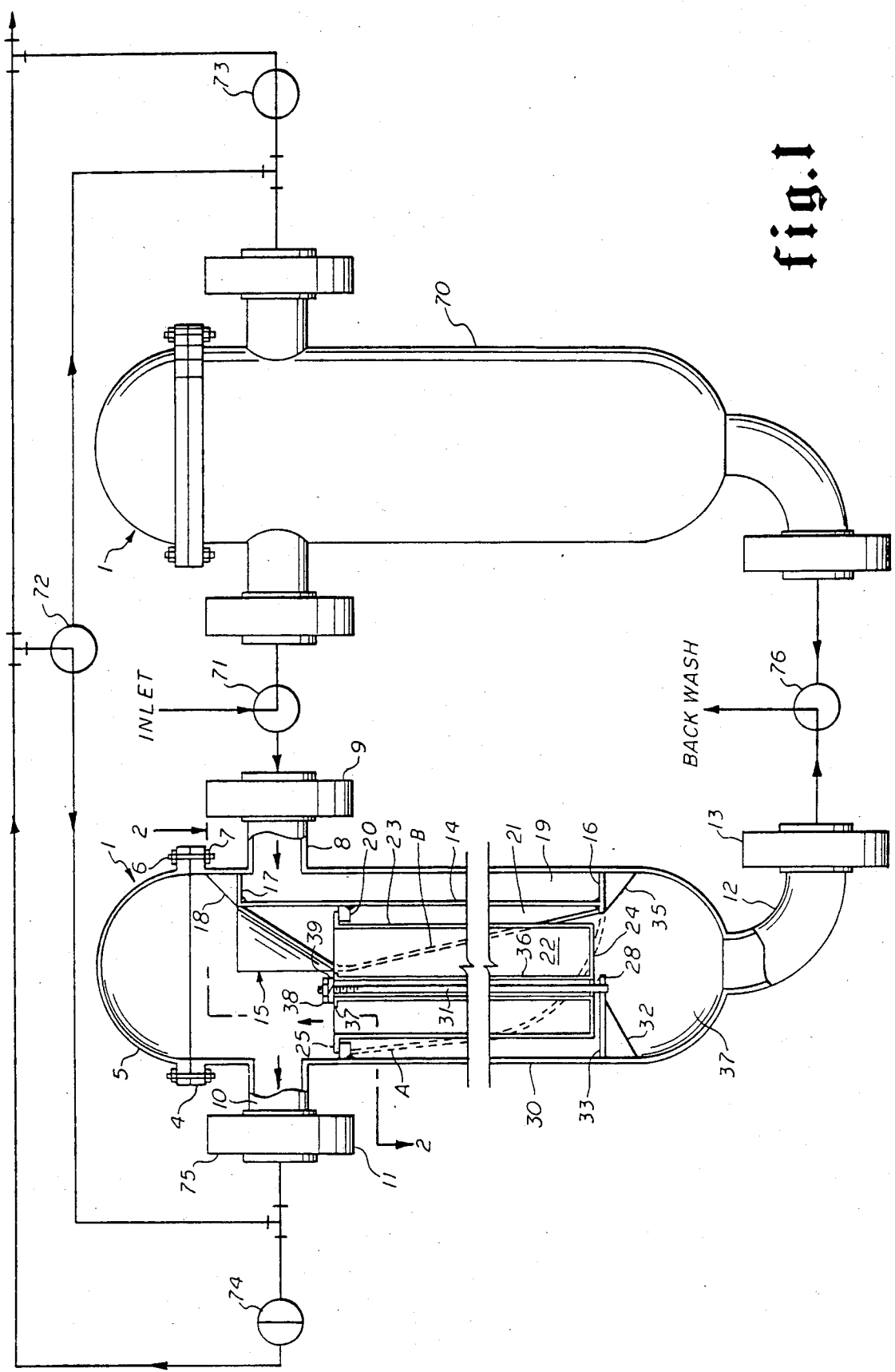
FIG. 1 is a partial plan and sectional view of a multiple filter system of the invention.

The filter system of the invention is indicated generally at 1 in FIG. 1. It includes a generally cylindrical housing 3 having a flange 4 mounted on one end for receiving a flanged cap 5 which is sealingly mounted with the flange 4 by a plurality of bolts 6 and nuts 7. The housing 3 has an inlet pipe 8 and an outlet pipe 10 mounted therewith for the supply and removal, respectively of fluid, liquid or gas, to the filter. Flanges 9 and 11 mounted with the inlet and outlet pipes permit the filter system to be flange mounted in a conventional piping system. The housing may include a backwash outlet pipe 12 mounted therewith, which may include a flange 13 for connection to a piping system to carry away the backwash discharge, as will be explained in detail later.

Figure 2:
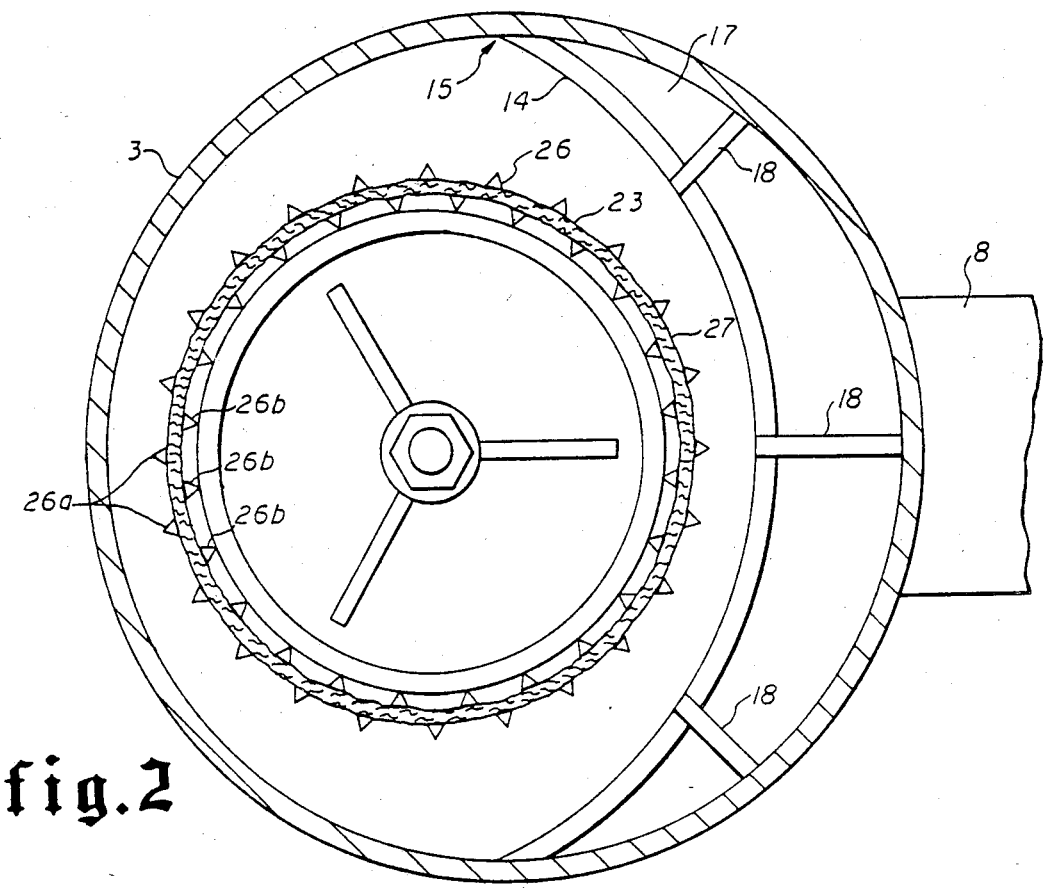
FIG. 2 is a sectional view along line 2—2 of FIG. 1.

A curved flow baffle 14, comprising a curved plate, is mounted in the housing 2. The baffle 14 is mounted on and supported by bracket 16 fixed in the housing 3. As best seen in FIG. 2, the curved flow baffle intersects the housing inner perimeter as indicated at 15, and is sealingly mounted therewith by welding or any suitable means. A generally crescent shaped cap plate 17 is sealingly connected with the flow baffle and the housing inner perimeter. The flow baffle and cap plate define a first chamber 19 communicating with the inlet 8. The flow baffle 14 is preferably positioned so that inlet flow is directed on the vertical center line of the baffle, as shown in FIG. 2. Gussets 18 are connected to the flow baffle, cap plate, and housing by welding or other suitable means to strengthen the assembly.

As shown in FIG. 1, the flow baffle 14 preferably partially wraps around the filter element 22. The flow baffle configuration indicated by dashed lines A results in uniform distributed flow through all parts of the filter element 22, that is the pressure at all points about the basket is equalized. The baffle may, of course, be configured for the type of flow distribution desired, such as that indicated at B in FIG. 1.

The flow baffle also defines a chamber 21 in the housing. The housing ring flange 20 is sealingly mounted, such as by welding, to the housing inner perimeter and the flow baffle in the second chamber. As best seen in FIG. 1, the ring flange 20 has a circular opening therethrough for receiving the flange 25 of a filter element or basket, indicated at 22. The filter basket 22 has a tubular body 23 for filtering a fluid, a bottom 24 mounted with the body and a flange 25 mounted with the other end of the body. The filter basket body comprises a filter medium 30, such as filter screen or mesh, in tubular configuration and connected to the flange 25 and bottom 24.

Figure 3:
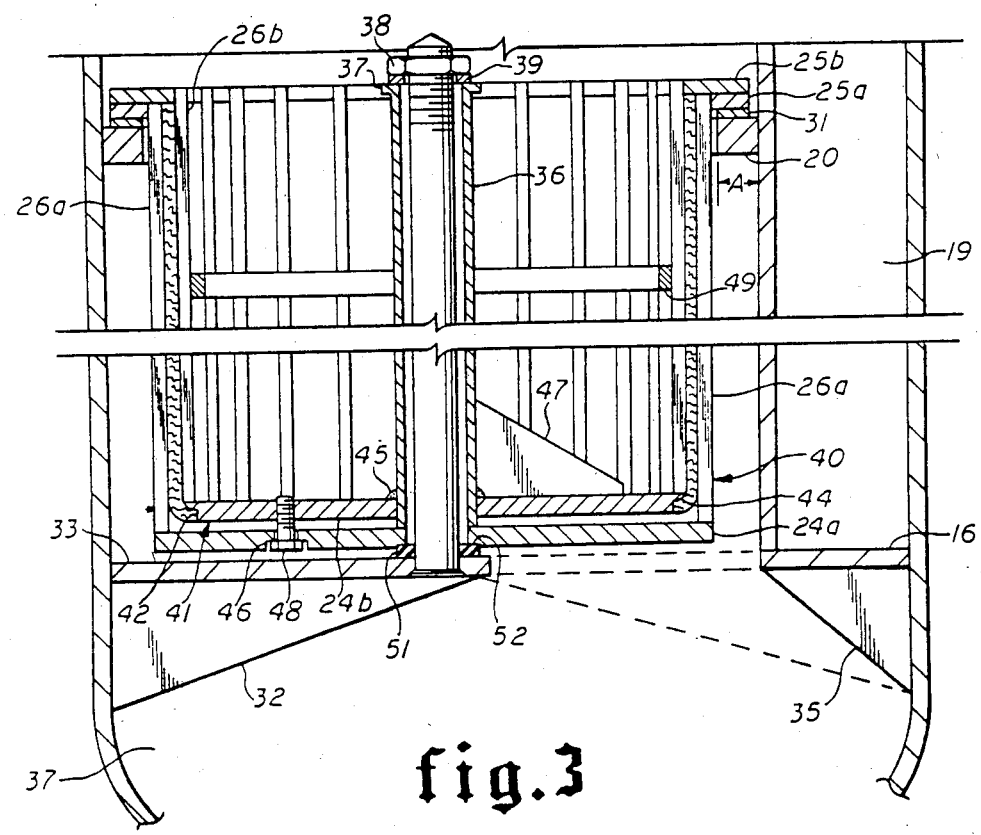
FIG. 3 is a sectional view of an embodiment of the invention.

The filter basket bottom 24 is provided with an opening 28, axial to the filter basket 22. The basket 22 is mounted in the housing chamber 21 in tension by pulling down on the basket bottom 24 to pull the basket flange 25 into sealing engagement with the housing ring flange 20. A gasket 31 may be provided between the basket flange 25 and the flange 20 to enhance sealing. The tensioning force is preferably provided by a rod 31 fixed to a pull plate 33 fixed to the housing inner perimeter. A gusset 32, mounted on the plate 33 and the housing, fixes the rod 31 with respect to the housing 30. It should be noted that in a large filter system it is desirable to extend pull plate brackets radially and provide for their interconnection (not shown), for example, by welding or bolting, to more rigidly mount rod 31 and resist bending of the pull plate 33, as shown in FIG. 3. It is likewise desirable in such case to extend the gusset 32 radially to add further resistance to bending. It should be noted that the pull plate 33 and bracket 16 are preferably of widths sufficient to adequately fix the rod 31 and baffle 14, respectively, without blocking fluid communication between elbow 12, chamber 21, and housing volume 37, to avoid restricting flow and permit backwashing of the filter, as will be explained in detail below.

The rod 31 extends upwardly through the opening 28 in the filter basket bottom 24. A tube 36 is positioned around the rod 31 and abuts the basket bottom 24. The tube 36 preferably sealingly engages the basket bottom 24 by welding or otherwise to provide a leak tight connection between the tube and the basket bottom. The rod 31 may be threaded at its upper end for engaging with a nut 38. A washer 37 is preferably fixed to the tube 36, for example, by welding, or formed thereon (not shown), for engaging the lockwasher 39.

Tensioning the basket 22 is accomplished by tightening the nut 38 on the rod 31. The tensioning force pulls the filter basket flange 25 into sealing engagement with the housing ring flange 20, preventing passage of fluid through that juncture. It will be appreciated that the diameter of the opening through the housing ring flange 20 is maximized by mounting the basket in this manner. As bolts through the basket flange 25 engaging the housing ring flange 20 are not required, the width of the housing flange, indicated at "A" in FIG. 3, need only be sufficient to support and sealingly engage with the basket flange 25. Thus, a larger filter basket 22 may be used in the filter of the invention.

To provide temperature compensation, the tube 36 and the rod 31 are preferably the same length and material as the filter basket 22. The co-efficient of thermal expansion of the rod, tube, and basket is then the same, and changes in length caused by temperature, for example, where cold or hot fluids are filtered, in the basket 22, pull down tube 36, and rod 31 will be equal. Thus, the tension on the basket is maintained constant regardless of temperature.

Tensioning the filter basket prevents collapse of the body 23 under high differential pressures. Another advantage of tensioning the filter basket is prevention of flutter of the filter basket 22 and particularly of the body 23 due to pulsating flow through the filter. Flutter bends the tubular body 23 and causes fatigue, deterioration, and cracking or breaking of the filter medium.

Flutter is particularly destructive to fragile filter media, such as sintered metal. The problem is overcome by supporting the filter medium, as shown in FIGS. 2 and 3, with a plurality of spaced apart rods 26, preferably in two concentric spaced apart circular rows. The filter basket in this embodiment includes an outer support basket indicated generally at 40 and an inner support basket indicated generally at 41. The outer support basket 40 includes an outer bottom plate 24a, support rods 26a, and an outer basket flange 25a. The outer bottom plate and outer basket flange are mounted, respectively, with opposite ends of the outer support rods 26a. The inner support screen 41 fits inside the outer support screen 40 and includes an inner bottom plate 24b, inner support rods 26b and an inner basket flange 25b. The inner support rods 26b have opposite ends respectively mounted with the inner bottom plate 24b and the inner flange 25b. The filter medium 27 is connected to the inner support screen 41 at the groove 42 and at the flange 25b by welding, brazing, or other suitable means.

The groove 42 preferably includes a surface 44 curving upwardly and outwardly to support the filter medium 27 at the transition into the groove 42, for preventing point stress on the filter medium.

The inner support screen 41 fits snugly into the outer support screen 42, thereby supporting the filter medium inside and out. Preferably no gasket is used between the first 25b and second 25a flanges, however, if one is desired, it should be hard and thin.

In operation, this embodiment of the filter basket of the invention is tensioned similar to that previously described. Tensioning rod 31 and tube 36, in conjunction with the nut 38 engaging the rod, tension the basket. In this embodiment, however, the tube 36 is preferably fixed to the inner support screen at the inner bottom plate 24b, welding or other means as indicated at 45. The tube 36 extends through bottom plate 24b and is urged by nut 38 into abutting engagement with the outer bottom plate 24a. It is desirable that the outer support screen 40 be removable as a unit with the inner support screen 41 and therefore the outer bottom plate 24a preferably includes, at spaced intervals, a plurality of counter-bored holes 46 for receiving bolts 48 threadably engaging with the inner support screen bottom 24b. For large filter systems, or where filtering is accomplished at a large differential pressure, a screen reinforcing ring 49 is provided mounted to the inner support screen bars 26b to prevent their movement of flexing. Further, for large filter baskets, screen support gussets 47, preferably 3 in number at 120° intervals, are fixed to the tube 36 and the inner support screen bottom 24b to strengthen the inner support screen assembly. A contained gasket 51 is preferably mounted in groove 52 in the outer support screen 24a to seal between the filter basket and the pull plate 33 to prevent unfiltered fluid entering the pull down tube 36.

It should be noted the outer basket 40 of FIG. 3, when used in conjunction with a suitable tensioning means, such as shown in FIG. 1, is functional as a filter basket 22, provided holes 46 are not formed therethrough, or if so, are plugged with suitable plugging means. Thus, the outer filter basket 40 may be constructed as previously described, that is, the filter basket body 23 may be a filter screen or the like to support the filter medium 27. To change the filtering action of the filtering system, it is necessary only to loosen the hold down nut 38 and replace the tube 36 and the inner support screen 41 with a new tube 36, or vice versa.

The inner and outer screen support rods 26a, 26b, disposed as shown in FIG. 2, are preferably triangular in cross-section and located so that a flat surface of each rod is presented to and supports the filter medium 27. By supporting the filter medium with a flat surface, as opposed to a corner or point, point stresses on the filter medium 27 are prevented and forces caused by flow through the basket are distributed over a larger area of the filter medium 27, a characteristic which is extremely important to prevent deterioration when the filter medium 27 is fragile or brittle. Locating the inner support rod 26b and the outer support rods 26a so that the inner and outer rods are equally circumferentially spaced apart, as shown in FIG. 2, provides further support for filter media 27. When the dual basket configuration of FIG. 3 is employed, the circumferential spacing of the support rods described above is best accomplished by appropriately locating bolts 38 with respect to the inner and outer baskets.

With reference to FIG. 1, a multiple filter system is shown with schematic piping and valving for a continuous filtering system with alternate backwashing capability. As illustrated, the valves are positioned such that filter unit 70 filters the inlet flow from two-way valve 71. Filtered fluid routed through two-way valve 72 enters the outlet 10 of filter unit 75, and flows through the filter element, backwashing it. Reversing valves 71, 72, 73, 74 and 76 permit uninterrupted filtering through filter unit 75 and backwashing of unit 70.

Figure 4:
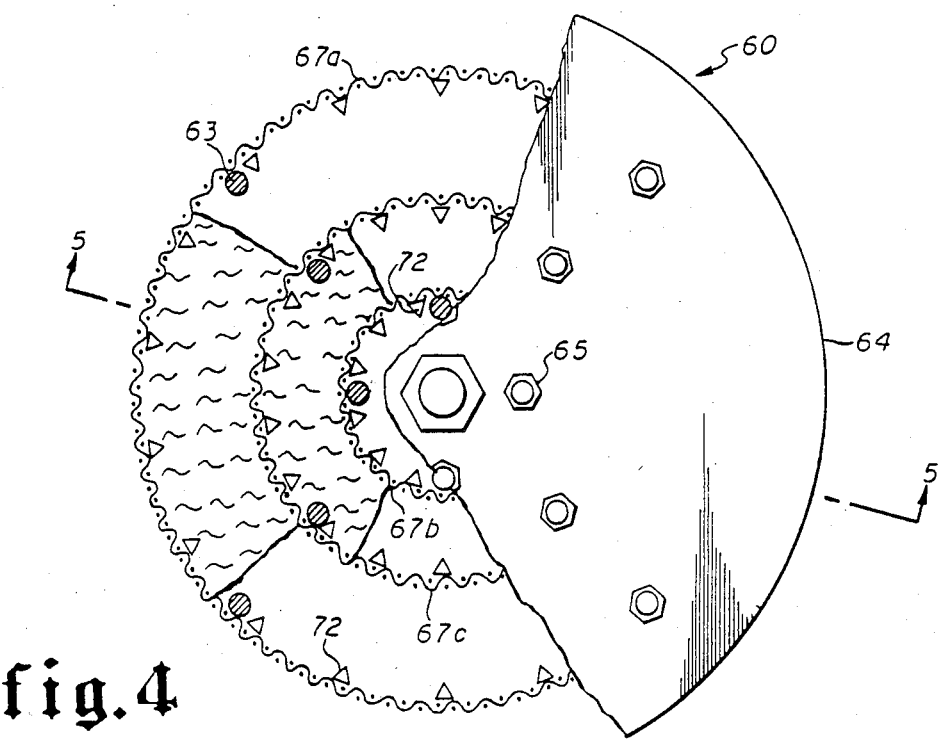
FIG. 4 is a sectional view of an embodiment of the filter element basket of the invention.
Figure 5:
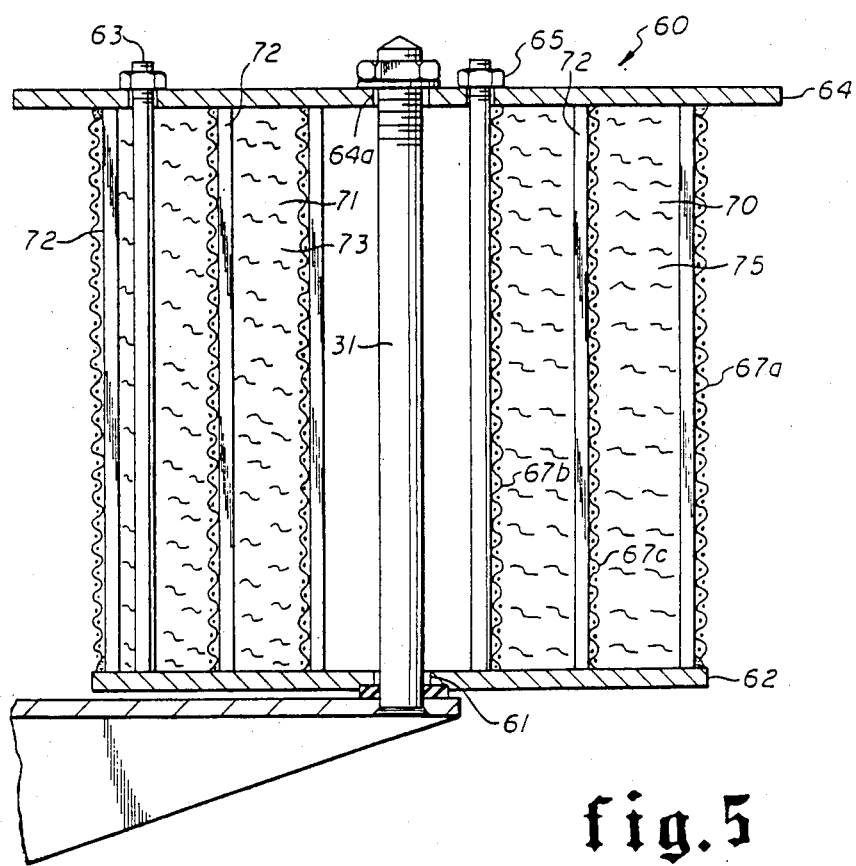
FIG. 5 is a sectional view along line 5—5 of FIG. 4.

A filter basket for indepth filtering is illustrated in FIG. 4. The indepth filter basket of the invention is indicated generally at 60, and includes a bottom plate 62 and a cover plate 64. The bottom plate 62 has an opening 61 for receiving pull down rod 31. The basket tensioning means in this embodiment is preferably identical to that previously described.

A plurality of longitudinally extended cover rods 63 have a first end connected to the bottom plate 62 and a second threaded end for engaging with the cover nuts 65. The top plate 64 has a plurality of openings 64a for receiving the cover hold down bolts 63. Preferably three screens, an outer screen 67a, a center screen 67c, and an inner screen 67b are provided mounted in the basket 60. Preferably, triangular support rods 72 are welded to and support the filter screens 67a, b, c. The annular spaces 70 and 71 between the screens may be filled with castable metallic or ceramic filtering tubes or a filter medium of the appropriate type may be poured or packed into such space. Further, the filter basket 60 is appropriate for tubular fibrous filtering media or for direct die compressing of fibers or fibrous material into the annular spaces. It is perferable that inner screen 67c not be used if a single uniform castable filter medium is to be poured into the filter basket.

The filter basket is assembled by positioning the cover plate 64 over the cover pull down bolts 63 and tightening the cover nuts 65 to affect a compressive seal between the cover plate 64, the filter media 73 and 75, and the screens 67a, b, c.

It is apparent that a filter basket for indepth filtering is provided which permits assembly of a filter for any desired degree or range of filtering and a filter in which the action is easily changed without removing the basket from the housing by merely removing the cover 64 and replacing the screens 67a, b, c and filter media therebetween. Further, through the choice of appropriate screens 67a, b, c and filter media 73, 75, successive filtering action of any degree is obtainable.

It is to be understood that the foregoing description is to be construed as illustrative only and is for the purpose of teaching those skilled in the art the manner of carrying out the invention, and that variations and modifications of the invention may be made without departing from the spirit hereof. It is also the be understood that the scope of the invention is not to be interpreted as limited to the specific embodiments disclosed herein, but only in accordance with the appended claims when read in the light of the foregoing description.

What is claimed is:
1. A multi-purpose filter system comprising:
 a housing having an inlet for receiving fluid to be filtered and an outlet for removal of filtered fluid;
 a filter element for filtering the fluid;

means for mounting the filter element in the housing between the inlet and the outlet; and
a tensioning support mounted within said housing;
a tensioning rod affixed to said tensioning support, said tensioning rod extending through said filter element;
adjustable engaging means attached to said tensioning rod for exerting force on said filter element parallel to the cylindrical axis of said filter element thereby placing said element in tension to prevent collapse or flutter of said filter element during operation.

2. The filter system of claim 1, wherein the means for mounting the element in the housing comprises a housing flange having an opening therethrough mounted with the housing and a second flange engagable with the housing flange mounted with the element, whereby the basket is sealingly mounted by engagement with the housing flange and second flange.

3. The filter system of claim 1, wherein the rod and tube are substantially the same length and have the same coefficient of thermal expansion as the element, whereby tension is constant on the element regardless of temperature.

4. The filter system of claim 1, including a flow baffle mounted in the housing defining a first chamber communicating with the inlet and a second chamber communicating with the outlet and the first chamber, and wherein the element is mounted in the second chamber, whereby fluid to be filtered is dispersed through the first chamber and enters the second chamber at reduced velocity for flow through the filter basket.

5. The filter system of claim 4, wherein the flow baffle is formed to define a first chamber of sufficient volume to equalize the flow velocity of the fluid at substantially all points on the element, thereby distributing the flow through the filter basket.

6. The filter system of claim 4, wherein the flow baffle comprises a curved plate mounted in the housing defining an annular flow space between the plate and the housing in communication with the inlet and the second chamber.

7. The filter system of claim 6, wherein the element comprises an elongate filter basket having a body, a bottom mounted on the body, and a flange mounted on the body, and wherein the means for mounting the element in the body comprises a housing flange sealingly mounted in the second chamber and sealingly engagable with the basket flange in response to tension on the basket, whereby the housing flange and basket flange are urged into sealing engagement.

8. The filter system of claim 7, wherein the flow baffle comprises a longitudinally extended curved plate extending substantially the length of the basket and having a bottom end tapered generally upwardly from the lateral centerline of the flow baffle.

9. The filter system of claim 8, wherein the bottom end of the flow baffle is formed to define a curve having an apex adjacent the bottom of the basket and extending upwardly to a point adjacent the housing flange.

10. The filter system of claim 9, wherein the flow baffle defines an entry volume in the first chamber longitudinally above the housing flange and communicating with the inlet, whereby fluid enters the first chamber entry volume and is directed through the first chamber at reduced flow velocity.

11. The filter system of claim 10, wherein the basket bottom has an opening formed therethrough, and the means for applying tension comprises having a first end mounted with the housing, a tube having a first end for engaging the basket bottom over the rod, and means engaging a second end of the rod for urging the tube into engagement with the basket bottom, thereby tensioning the basket.

12. The filter system of claim 11, wherein the housing includes a backwash port communicating with the second chamber.

13. The filter system of claim 1, wherein the filter element comprises an outer filter basket, an inner filter basket in the outer basket, defining an annular space between the sides of the inner and outer baskets, and a filter medium in the space between the baskets, whereby the filter medium is supported by the baskets.

14. The filter system of claim 13, wherein the filter medium is sintered metal.

15. The filter system of claim 13, wherein the filter medium is precoat screen.

16. The filter system of claim 13, including means for mounting the filter medium with the inner basket, whereby the inner basket and filter medium are removable as a unit.

17. The filter system of claim 13, including means for mounting the inner basket with the outer basket, whereby the baskets and filter medium are removable in the unit.

18. The filter system of claim 17, wherein the means for mounting the inner basket with the outer basket comprises a plurality of bolts mounted through a plurality of holes formed in the outer basket bottom and threadably engaging threaded holes formed in the inner basket bottom.

19. The filter system of claim 13, wherein the outer filter basket has a body comprising a second filter medium whereby the outer basket pre-filters fluid.

20. The filter system of claim 13, wherein the inner and outer baskets include inner and outer basket bottoms having openings formed therethrough and the means for tensioning the basket comprises a rod through the openings having a first end mounted with the housing, a tube having a first end for engaging the inner basket bottom mounted over the rod, and means engaging a second end of the rod for urging the tube into engagement with the basket bottom, thereby tensioning the basket.

21. The filter system of claim 20, including means for mounting the second end of the tube with the inner basket bottom.

22. The filter system of claim 13, wherein the outer filter basket includes a body comprising a plurality of spaced apart elongate bars having at least one longitudinally extended generally flat surface formed thereon abutting the filter medium.

23. The filter system of claim 13, wherein the inner filter basket includes a body comprising a plurality of spaced apart elongate bars having at least one longitudinally extended generally flat surface formed thereon abutting the filter medium.

24. The filter system of claim 22 or 23, wherein the bars are triangular in cross-section.

25. The filter system of claim 1, wherein the filter element comprises a bottom, a cover having an opening therethrough for outflow of filtered fluid, at least two filter screens comprising a plurality of elongate support bars fixed to a tubular filter medium, concentrically mounted between the bottom and the cover, and defining at least one chamber between the screens, and means for urging the bottom, screens and cover together to form an indepth filter element.

26. The filter system of claim 25, including a filtering medium in at least one of the chambers.

27. The filter system of claim 26, wherein the means for mounting the filter element in the housing comprises a housing flange having an opening therethrough mounted in the second chamber of the housing sealingly engagable with the cover of the element.

28. The filter system of claim 27, wherein the bottom has an opening formed therethrough and the means for tensioning the filter element comprises a rod through the filter element having a first end mounted with the housing, a tube over the rod having a first end for engaging with the bottom, and means engaging the second end of the rod for urging the tube into engagement with the basket bottom, thereby tensioning the basket.

29. A multi-purpose filter system as recited in claim 1 wherein:
said adjustable engaging means is a nut threadably connected to said tensioning rod.

30. A multi-purpose filter system as recited in claim 29 further comprising:
a tube mounted within said filter element providing residence for said tensioning rod where said tensioning rod extends through said filter element;
a bearing surface affixed to said tube for engaging said nut.

31. A basket-type filtering device comprising:
(a) a housing having inlet and outlet ports;
(b) a support ring mounted within said housing;
(c) a basket filter element having a radially extending flange affixed thereto adapted to reside in sealed relationship with said support ring;
(d) a stress tube axially mounted within said basket filter element;
(e) a tensioning bracket affixed to the inner wall of said housing below said basket filter element;
(f) a tensioning rod means affixed at a first end to said tensioning bracket and extending through said stress tube;
(g) a nut threadably engaging a second end of said tensioning rod means so that when said nut is tightened against said stress tube, the perimeter of said basket filter is placed in tension and maintained in tension while said filter is in operation regardless of orientation thereby preventing collapse or flutter of said basket filter element.

32. An operating basket-type filtering device comprising:
(a) a housing having inlet and outlet ports;
(b) a support ring mounted within said housing;
(c) a basket filter element having a radially extending flange affixed thereto adapted to reside in sealed relationship with said support ring;
(d) a tensioning plate mounted within said housing;
(e) a tensioning rod means having proximal and distal ends, said tensioning rod means connected at said proximal end to said tensioning plate and connected at said distal end to said basket filter element, said tensioning rod means maintaining the perimeter of said basket filter element in tension during operation thereby preventing collapse or flutter of said basket filter element either during normal operation or backflushing.

* * * * *